United States Patent
Bürger et al.

(10) Patent No.: US 9,128,201 B2
(45) Date of Patent: Sep. 8, 2015

(54) LIGHT GRID

(75) Inventors: Jürgen Bürger, Nimburg (DE); Daniel Kietz, Riegel (DE)

(73) Assignee: Sick AG, Waldkirch (DE)

( * ) Notice: Subject to any disclaimer, the term of this patent is extended or adjusted under 35 U.S.C. 154(b) by 67 days.

(21) Appl. No.: 13/224,392

(22) Filed: Sep. 2, 2011

(65) Prior Publication Data

US 2012/0068055 A1   Mar. 22, 2012

(30) Foreign Application Priority Data

Sep. 21, 2010   (DE) .......................... 10-2010-037681

(51) Int. Cl.
*G08B 13/183*   (2006.01)
*G01V 8/20*   (2006.01)

(52) U.S. Cl.
CPC ........................................ *G01V 8/20* (2013.01)

(58) Field of Classification Search
CPC ............. G01V 8/10; G01V 8/20; G01V 8/12; G08B 13/183; F16P 3/12; F16P 3/14
USPC ................ 250/216, 221, 222.1; 340/555–557
See application file for complete search history.

(56) References Cited

U.S. PATENT DOCUMENTS

| | | | | |
|---|---|---|---|---|
| 6,958,465 | B2* | 10/2005 | Haberer et al. | 250/221 |
| 7,741,595 | B2* | 6/2010 | Lohmann et al. | 250/221 |
| 7,960,681 | B2* | 6/2011 | Carnicelli et al. | 250/221 |
| 2007/0200699 | A1* | 8/2007 | Rohbeck | 340/555 |

FOREIGN PATENT DOCUMENTS

| | | |
|---|---|---|
| DE | 29 14 329 A1 | 11/1979 |
| DE | 3803033 A1 | 8/1989 |
| DE | 43 38 978 C2 | 5/1998 |
| DE | 100 46 136 A1 | 4/2002 |
| DE | 10 2005 047 776 B4 | 10/2007 |
| DE | 102006052097 B3 | 5/2008 |
| DE | 10 2006 059 370 A1 | 6/2008 |
| DE | 102007044679 B3 | 11/2008 |
| DE | 10 2007 043 557 A1 | 3/2009 |

(Continued)

OTHER PUBLICATIONS

German Examination Report, received Apr. 5, 2011, five (5) pages.

*Primary Examiner* — Georgia Y Epps
*Assistant Examiner* — Don Williams
(74) *Attorney, Agent, or Firm* — Nath, Goldberg & Meyer; Jerald L. Meyer; Stanley N. Protigal

(57) ABSTRACT

A light grid (10) with a transmission unit (12) comprising a plurality of individual light transmitters (14) and a transmitter control (24) for activating the individual light transmitters (14), and with a reception unit (16) comprising a plurality of individual light receivers (18) corresponding to the individual light transmitters (14) and comprising an evaluation unit (26) connected to the individual light receivers (18) is provided, wherein the evaluation unit (26) is configured to detect an interruption of a light beam (20) from an individual light transmitter (14) to a corresponding individual light receiver (18) and to be optically synchronized with the transmitter control (24) by means of the light beams (20). The transmitter control (24) is configured to transmit a synchronization signal on multiple individual light transmitters (14) in parallel.

14 Claims, 2 Drawing Sheets

(56) References Cited

FOREIGN PATENT DOCUMENTS

Figure 1:
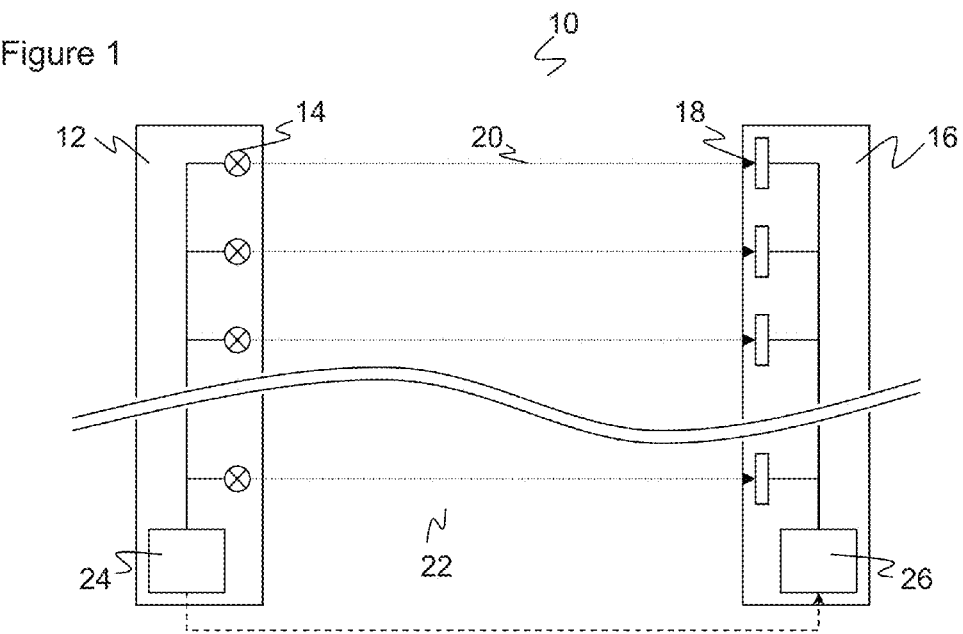

| | | | |
|---|---|---|---|
| DE | 102007059565 A1 | 6/2009 | |
| DE | 102008022791 A1 | 12/2009 | |
| EP | 1 437 605 A2 | 7/2004 | |
| EP | 1772753 A1 | 4/2007 | |
| EP | 1 903 356 A1 | 3/2008 | |
| EP | 1933174 A2 | 6/2008 | |
| EP | 2071363 A2 | 6/2009 | |
| GB | 2 023 282 A | 12/1979 | |

* cited by examiner

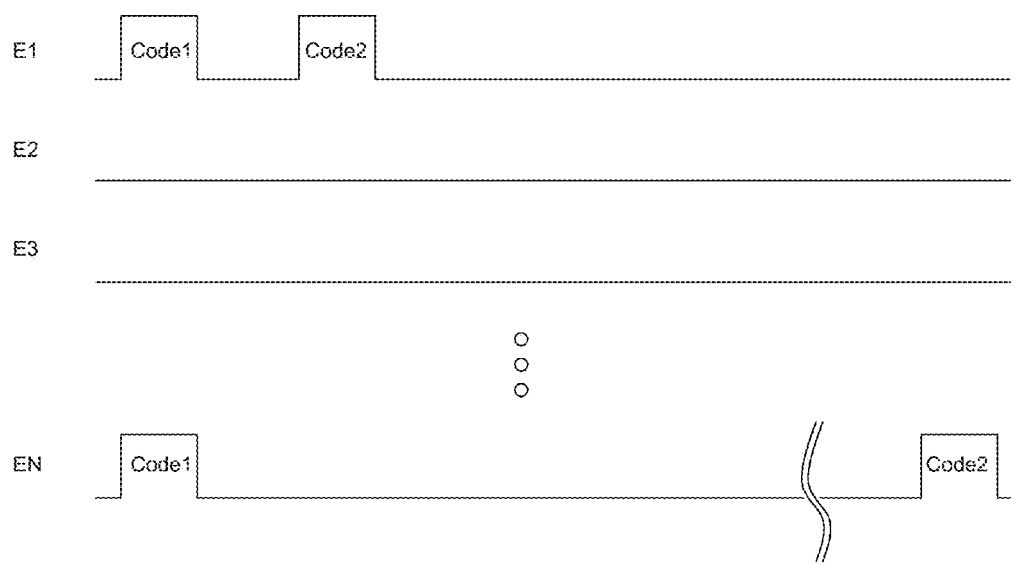

LIGHT GRID

The invention relates to a light grid and a method for object measurement with a light grid according to the preamble of claims 1 and 14, respectively.

Light grids, sometimes also referred to as light curtains, comprise a plurality of transmission elements and corresponding reception elements, such that each pair of a transmission element and a respective reception element forms a light barrier that detects whether or not the light beam formed between the transmission element and the reception element is interrupted. The transmission elements and the reception elements are combined in a transmission unit and a reception unit, respectively, mounted opposite each other.

An important field of application for light grids is safety technology. There, the parallel light beams are used as a kind of virtual wall, and in case of interruption by an object, for example, a source of danger is secured. In automation technology, light grids are used to measure a dimension of objects based on the number of interrupted beams. For example, the height of objects being moved on a conveyor belt can be determined with an accuracy that is given by the mutual distance of the light beams.

The concept of a light beam of the individual transmission elements is idealized. In fact, transmission cones and reception cones are generated in dependence of the aperture angle of the beam shaping optical elements. With usual distances between transmission unit and reception unit it is often inevitable that due to the transmission beam divergence a reception element does not only receive transmission light from the corresponding transmission element, but also from its neighbors. Thus, in order to avoid evaluation errors, the transmission elements are cyclically activated. Individual light pulses or light packets are sequentially transmitted by each transmission element, and during a certain time window only the corresponding reception element is activated in order to determine whether there is an object in the respective channel.

To that end, the reception unit needs to know the time window during which a respective transmission element is active, and also which transmission element is active during this time window. Therefore, transmission unit and reception unit are to be synchronized with each other. One has to distinguish cable synchronization and optical synchronization.

Cable synchronization means any method using a continuous connection between transmission unit and reception unit and is, therefore, independent of the light beams. For example, the beginning of an evaluation cycle is communicated via a direct cable connection or a wireless connection. This approach is chosen for measuring automation light grids, where it is important to detect the state of the beam paths at any time and irrespective of channel occlusion. The disadvantage is higher installation and wiring costs for the user and higher manufacturing costs.

Optical synchronization uses the already existing connection between transmission unit and reception unit, namely, the light beams. The direction of data is generally unidirectional, with the transmission unit acting as master. Different methods for optical synchronization are known. Usually, one channel is selected as a dedicated synchronization channel. If an object is present in this channel, the synchronization and with it the reliable operation of the measuring light grid fails.

This has little adverse effect in switching system that merely detect the presence of an object in the monitoring area of the light grid. Here, the interrupted synchronization channel correctly leads to a presence detection, and it is of no importance for a mere binary object detection whether additional channels are also interrupted. However, in case it is to be determined which of the light beams are interrupted, the synchronization channel has to always remain unobstructed.

There are a number of prior art approaches to optical synchronization. However, they require either a complex coding leading to long cycles, or synchronization is slow because it takes several cycles.

From DE 100 46 136 A1 an apparatus for the identification of light barrier transmitters is known. The light receiver responds only to the light transmitter that cyclically transmits a specific data pattern to exclude the possibility that a receiver responds to a non-associated transmitter. The document does not explain how the synchronization is achieved.

In DE 10 2006 059 370 A1, the reception pattern is correlated with a reference pattern in the reception unit of a light grid. Thereby, a phase delay by which the patterns are mutually offset is obtained for the synchronization. This type of synchronization works only if an object does not obstruct a number of channels sufficient for a reliable correlation.

DE 10 2005 047 776 B4 discloses a method for operating a light grid wherein each light beam uses a unique identification for an optical synchronization. Once a receiver has registered its identification, the synchronization is done. The disadvantage is that the individual identification requires a correspondingly complex coding of the transmission signals in the channels. This leads to a relatively long transmission time and with it a slow cycle time and a high power consumption of the transmitter. An individual identification per beam is also used in DE 43 38 978 C2.

It is therefore an object of the invention to provide a robust and simple optical synchronization for a light grid.

This object is satisfied by a light grid according to claim 1 and a method for object measurement with a light grid according to claim 14. The invention starts from the basic idea to use multiple or even all channels of a light grid for the synchronization. Unlike the prior art, the individual light transmitters are not exclusively activated one after the other, but they transmit in parallel for the synchronization, i.e. overlapping in time and, in particular, simultaneously. The synchronization signal is an arbitrary pulse or a pulse sequence by which the evaluation unit determines that it is a synchronization signal. The identity of the channel on the other hand is not encoded in the synchronization signal. Preferably, all channels use the same synchronization signal. Thus, a very simple code can be used, and it even suffices if it is a single pulse.

The invention has the advantage that an optical synchronization is also achieved if an arbitrary number of channels is occluded by an object in the monitoring area. Even if all channels are interrupted, a unique state is detected, namely, that apparently an object exists that occludes all the light beams. In that case, although no synchronization is possible any longer, nevertheless the correct measurement result is obtained. A complex individual beam encoding is not required, because only the cycle beginning is coded by the synchronization signal. Thus, the state of the beam is detected uniquely and with short cycle time at arbitrarily interrupted beams. The synchronization is carried out within one cycle.

The transmitter control is preferably configured to transmit via the individual light transmitters a respective object detection signal with a different time offset to the synchronization signal for each individual light transmitter. In this and subsequent paragraphs, the term preferably describes preferred, but optional features that are not necessarily required for the invention. The object detection signals are the actual operating signals of the light grids by means of which objects are detected in the light beam. They are transmitted in a time-division multiplexing with a mutual time offset to avoid wrong associations between individual light transmitter and individual light receiver. The object detection signal differs from the synchronization signal in its coding. However, the same object detection signal is preferably used for all channels, such that an individual identification is not required. Thus, a very simple and short coding can be used.

The transmission signal of the $i^{th}$ individual light transmitter preferably comprises the synchronization signal and an object detection signal offset from the synchronization signal by i time units. Hence, the object detection signals are evenly distributed over the time interval following the synchronization signal, wherein the channels are for example activated from top to bottom according to their position in the light grid. This is a simple, logically well comprehensible activation scheme. However, the numbering of the channels can also deviate from the simple sequence as described. Moreover, irregular time offsets between the individual channels are conceivable.

The signal shape of the synchronization signal and/or the object detection signal is preferably the same for all individual light transmitters. The signal shape, i.e. the amplitude course of the transmission signals, enables an encoding. According to this embodiment of the invention, no individual channel encoding is provided. The synchronization signal is only discernable from the object detection signal as such, whereas the same synchronization signal and the same object detection signal are used for all channels. In principle, a single pulse for the synchronization signal and a longer pulse or a double pulse for the object detection signal suffices. Of course, different encodings are possible.

The transmitter control is preferably configured to cyclically repeat the transmission pattern of common synchronization signal and mutually time offset object detection signals. In particular, the synchronization signal is transmitted at the beginning of each cycle. The transmission unit transmits, for example, at first the simultaneous synchronization signal on all channels and subsequently the object detection signal once on each channel with a time offset, whereupon the cycle is repeated.

The evaluation unit is preferably configured to simultaneously receive light beams via multiple, in particular via all individual light receivers prior to the synchronization. Thus, as long as no synchronization is achieved, the transmission unit listens with multiple or all individual light receivers.

The evaluation unit preferably synchronizes with the transmitter control by determining the beginning of a detection cycle from the reception point in time of the synchronization signal received on any one of the individual light receivers. Once the synchronization signal has been received on at least one channel, the synchronization is successful. The beginning of a cycle is set to the time of the synchronization signal, wherein a constant time offset can be accounted for if the synchronization signal is not the beginning of a cycle.

The evaluation unit is preferably configured to, after the synchronization, selectively activate only the respective individual light receiver whose corresponding individual light transmitter is transmitting an object detection signal in the respective time interval. The channels are cyclically passed through by activating only that individual light receiver via time multiplexing from whose corresponding individual light transmitter a signal is expected. This precludes that an individual light receiver wrongly detects the signal of an individual light transmitter other than the associated one, and thus misses an object in its own light beam. It is sufficient to synchronize the cycle as such, since the timing within a cycle can be predefined for the light grid, so that it is known to the evaluation unit in advance in which time windows the transmission unit activates what individual light transmitter.

The light grid is preferably made as a measuring light grid in that the evaluation unit is configured to output a measuring signal including an object dimension determined from the light beams that were detected as interrupted. Unlike a mere switching light grid it is evaluated which beams are interrupted, or, for example, which is the highest interrupted beam. With that, one object dimension can be measured, which often is the object height with an according arrangement of the light grid. Generally, the one dimension is the object dimension orthogonal to the individual beams within the plane formed by the beams.

The method in accordance with the invention can be further developed in a similar manner with additional features and shows similar advantages. Such advantageous features are described in an exemplary, but not exclusive manner in the subordinate claims following the independent claims.

Figure 2:
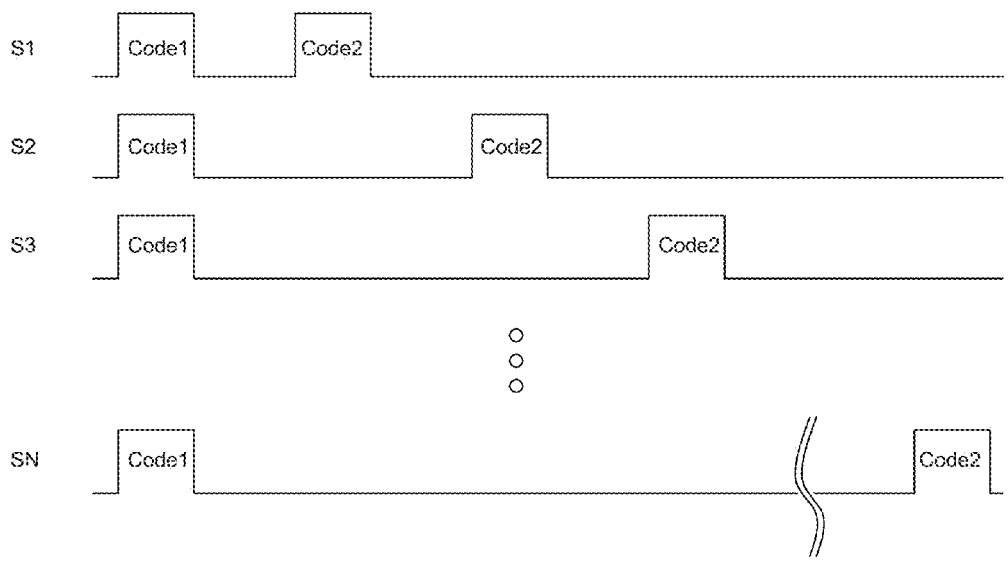

The invention will be explained in the following also with respect to further advantages and features with reference to exemplary embodiments and the enclosed drawing. The Figures of the drawing show in:

FIG. 1 a schematic cross sectional view of a light grid;

FIG. 2 a time course of the signal pattern in the channels of a light grid according to FIG. 1 in an embodiment of the invention; and FIG. 3 an exemplary time course of the reception pattern for a transmission pattern according to FIG. 2.

FIG. 1 shows a schematic block diagram of a light grid 10. A transmission unit 12 with a plurality of light transmitters 14 and a reception unit 16 with a plurality of light receivers 18 are arranged opposite each other. From the light transmitters 14, a respective light beam 20 is formed to a corresponding light receiver 18. Thus, the light grid 10 forms a plurality of light beams 20 or channels to detect objects in a monitoring area 22 between the transmission unit 12 and the reception unit 16. Other than in the diagram, an optical device including apertures and the like can be arranged at the light transmitters 14 and the light receivers 18 in order to shape the light beam 20 and to selectively direct the light beam 20 onto a light receiver 18 only within a defined reception cone, respectively.

In the transmission unit 12, a transmitter control 24 is directly or indirectly connected to all light transmitters 14 to control their activity and to trigger them to transmit specific signal shapes. As a counterpart, an evaluation unit 26 is provided in the reception unit 16, which is directly or indirectly connected to all light receivers 18 to evaluate the reception signals. The evaluation unit 26 detects from the reception signals which light beams 20 are interrupted and which are not.

According to the object detection method described in the introduction, the light transmitters 14 do not transmit in continuous operation, but they are cyclically activated in sequence to avoid ambiguities in the reception unit 16. To that end, the transmitter control 24 and the evaluation unit 26 are optically synchronized, as indicated by a dashed line.

The optical synchronization according to the invention is now explained with reference to FIGS. 2 and 3. FIG. 2 shows an exemplary time course of the transmission patterns S1 . . . SN in the individual channels, and FIG. 3 shows an exemplary time course of the reception patterns E1 . . . EN in the individual channels.

In an exemplary embodiment of the invention, the light transmitters 14 continuously transmit the transmission pattern as shown in FIG. 2. The beginning of the cycle is signaled by a synchronization signal or a cycle start signal, respectively, in the form of a unique pulse sequence Code1. The synchronization signal is transmitted simultaneously from all light transmitters 14. This is followed by an object detection signal Code2 from each light transmitter 14 with an individual time offset. For example, as shown in FIG. 2, the object detection signal is transmitted at first in the first channel S1 and then successively with time offsets in the channels S2, S3, . . . , SN. The object detection signal can be distinguished from the synchronization signal by its pulse shape. No further properties of the synchronization signal and the object detection signal are required.

As long as the evaluation unit 26 is not synchronized, it ensures that multiple or even all light receivers 18 are receiving simultaneously. FIG. 3 shows an exemplary reception pattern E1 . . . EN in a situation where an object interrupts the beam paths for all channels Ki except the outermost channels K1 and KN. The evaluation unit 26 evaluates whether the synchronization signal could be received in at least one channel Ki. If that is the case, the point in time of the beginning of the cycle is known to the reception unit, and the synchronization has been successful.

Due to beam diameters increased with distance, it can easily occur that a light receiver 18 receives transmission light from multiple light transmitters 14. This is only in favor of the synchronization process, since the synchronization does not depend on reception of the synchronization signal from a specific light transmitter 14. It is only important to register any synchronization at all in order to determine its point in time.

After synchronization, the evaluation unit 26 switches over into the operational phase. Therein, only the light receiver 18 is selectively activated or evaluated whose associated light transmitter 14 in the same channel currently transmits its object detection signal. These time windows are known to the evaluation unit 26 because of the synchronization. The cyclic evaluation of the light grid 10 is therefore executed with the correct timing.

Here, the communication is generally unidirectional. Should a communication in the reverse direction also be possible, it will usually be easier to use this path of communication for the synchronization. Consequently, the transmitter control according to the invention generally does not know if and when synchronization takes place. In principle, the mutually time offset object detection signals are unnecessary before the synchronization, and the simultaneous synchronization signals are unnecessary after the synchronization. However, as the transmitter control 24 does not have any information in this respect, it transmits the transmission pattern shown in FIG. 2 continuously and unchanged.

The invention claimed is:

1. A light grid with a transmission unit comprising a plurality of individual light transmitters and a transmitter control for activating the individual light transmitters, and with a reception unit comprising a plurality of individual light receivers corresponding to the individual light transmitters and comprising an evaluation unit connected to the individual light receivers, the evaluation unit configured to detect an interruption of a light beam from an individual light transmitter to a corresponding individual light receiver and optically synchronized with the transmitter control,
wherein, the transmitter control transmits a synchronization signal to the individual light transmitters simultaneously and in parallel, and each of the transmitters responds to the synchronization signal by transmitting an object detection signal with a time offset unique to that transmitter, and each of the receivers responds to the synchronization with a time offset unique to that receiver, wherein the time offsets of the transmitters and of the receivers correspond to predetermined ones of the light paths;
the reception unit transmits a synchronization signal corresponding to the synchronization signal transmitted by the transmitter control, to the individual light receivers;
the evaluation unit simultaneously receives signals from the receivers corresponding to reception of light beams via multiple individual light receivers and to determines a time offset value of signals from the receivers to determine a point in time of reception of the signals with respect to the synchronization signal, the point of time corresponding to the predetermined ones of the light paths.

2. The light grid of claim 1, wherein the transmitter control is configured to transmit a synchronization signal on all individual light transmitters in parallel.

3. The light grid of claim 1, wherein the transmitter control is configured to transmit via the individual light transmitters a respective object detection signal with a different time offset to the synchronization signal for each individual light transmitter.

4. The light grid of claim 3, wherein the transmission signal of the $i^{th}$ individual light transmitter comprises the synchronization signal and an object detection signal offset from the synchronization signal by i time units.

5. The light grid of claim 1, wherein the signal shape of the synchronization signal is the same for all individual light transmitters.

6. The light grid of claim 1, wherein the signal shape of the object detection signal is the same for all individual light transmitters.

7. The light grid of claim 1, wherein the transmitter control is configured to cyclically repeat the transmission pattern of common synchronization signal and mutually time offset object detection signals.

8. The light grid of claim 7, wherein the synchronization signal is transmitted at the beginning of each cycle.

9. The light grid of claim 1, wherein the evaluation unit is configured to simultaneously receive light beams via all individual light receivers prior to the synchronization and to use the time offset value to determine the detected light paths.

10. The light grid of claim 1, wherein the evaluation unit synchronizes with the transmitter control by determining the beginning of a detection cycle from the reception point in time of the synchronization signal received on any one of the individual light receivers.

11. The light grid of claim 1, wherein the evaluation unit is configured to, after the synchronization, selectively activate only the respective individual light receiver whose corresponding individual light transmitter is transmitting an object detection signal in the respective time interval.

12. The light grid of claim 1, that is made as a measuring light grid in that the evaluation unit is configured to output a measuring signal including an object dimension determined from the light beams that were detected as interrupted.

13. A method for object measurement with a light grid, using a plurality of light beams to evaluate light path interruption by an object, each light beam formed between an individual light transmitter and an individual light receiver, the method comprising:
transmitting a synchronization signal by multiple individual light transmitters simultaneously and in parallel;
causing each of the transmitters to respond to the synchronization signal by transmitting an object detection signal with a time offset unique to that transmitter;
causing each of the receivers to respond to the synchronization with a time offset unique to that receiver, wherein the time offsets of the transmitters and of the receivers correspond to predetermined ones of the light paths; and determining a time offset value of signals from the receivers to determine a point in time of reception of the signals with respect to the synchronization signal, the point of time corresponding to the predetermined ones of the light paths, wherein the evaluation unit simultaneously receives light beams via multiple individual light receivers prior to the synchronization and uses the time offset value to determine the detected light paths.

14. The method of claim 13, further comprising transmitting a synchronization signal by all individual light transmitters in parallel.

* * * * *